United States Patent [19]

Stetter

[11] Patent Number: 5,737,303
[45] Date of Patent: Apr. 7, 1998

[54] APPARATUS FOR STORING AND TRANSPORTING ESSENTIALLY DISK-SHAPED OBJECTS OF UNIFORM DIMENSIONS

[76] Inventor: Martin Stetter, Marktstrasse 61-63, 68789 St. Leon-Rot, Germany

[21] Appl. No.: 373,292

[22] PCT Filed: Jul. 1, 1993

[86] PCT No.: PCT/DE93/00578

§ 371 Date: Jan. 20, 1995

§ 102(e) Date: Jan. 20, 1995

[87] PCT Pub. No.: WO94/02941

PCT Pub. Date: Feb. 3, 1994

[30] Foreign Application Priority Data

Jul. 20, 1992 [DE] Germany .......................... 42 23 813.7

[51] Int. Cl.⁶ .................................................. G11B 17/04
[52] U.S. Cl. ................................................................ 369/191
[58] Field of Search ..................................... 369/191, 192, 369/178, 36; 360/92

[56] References Cited

U.S. PATENT DOCUMENTS

| | | | |
|---|---|---|---|
| 2,601,501 | 6/1952 | Cain | 369/36 |
| 3,369,814 | 2/1968 | Hart. | |
| 4,601,386 | 7/1986 | Antonello | 360/92 |

FOREIGN PATENT DOCUMENTS

| | | | |
|---|---|---|---|
| 2 388 367 | 11/1978 | France. | |
| 2 610 755 | 8/1988 | France. | |
| 3 327 121 | 2/1985 | Germany. | |
| 3187063 | 8/1991 | Japan | 369/178 |
| 6195848 | 7/1994 | Japan | 369/178 |

*Primary Examiner*—Stuart S. Levy
*Assistant Examiner*—Allen Cao
*Attorney, Agent, or Firm*—Bell Seltzer Intellectual Property Law Group of Alston & Bird LLP

[57] ABSTRACT

An apparatus for storing and transporting essentially round, disk-shaped objects of uniform dimensions, and which has at least one magazine. The magazine of the apparatus has at least one conveyor which is designed and dimensioned in such a way that disk-shaped objects can be placed on it with at least one edge face.

9 Claims, 4 Drawing Sheets

APPARATUS FOR STORING AND TRANSPORTING ESSENTIALLY DISK-SHAPED OBJECTS OF UNIFORM DIMENSIONS

BACKGROUND OF THE INVENTION

The invention relates to an apparatus for storing and transporting essentially round, disk-shaped objects of uniform dimensions, in particular compact-disk data carriers, and having at least one magazine.

Apparatus of the kind in question are already known for compact disks in combination with compact disk players, also known as compact disk changers. These known compact disk changers hold normally six to eights CDs. The archiving of larger quantities of CDs with these known CD changers requires a relatively large amount of space and is mass-intensive, since each individual CD is associated with a special plastic plate which, when a certain CD is accessed, is moved along with same. Further known from the art are so-called CD juke boxes, which are based on the principle of juke boxes for phonograph records, and have a capacity of about 50 to 100 CDs. A stationary, mechanical gripping device removes a CD from one position of a magazine movable relative to the gripping device, or a movable gripping device removes a CD from a stationary magazine, and transfers same to a CD player. In the former instance, the magazine does not move on, until the removed CD has been returned by means of the gripping device to its original position in the magazine. Only then, does the magazine advance for removal of another desired CD. This method results in relatively long waiting or access times when changing CDs. Furthermore, the known juke boxes are highly sensitive to mechanical vibrations of the magazine, which may cause the CDs to slide or fall out, thereby blocking the entire mechanism. The exchange of individual or all CDs of such apparatus is in most cases very expensive, and is normally done only by expert personnel.

In practice, both known systems are problematic with respect to their capacity, their space requirements, operative expenditure, and easy operability.

It is therefore the object of the invention to describe a device for storing and transporting essentially round, disk-shaped objects of uniform dimensions of the type in question, which allows to store in a smallest possible space a largest possible quantity of these disk-shaped objects, and enables a simplest and fastest possible access to a certain of the stored, disk-shaped objects.

SUMMARY OF THE INVENTION

The above and other objects and advantageous of the present invention are achieved by the provision of a data storage and transporting apparatus which comprises a plurality of data storage disks of uniform dimensions, and with the disks each having an essentially round peripheral edge portion. Also, the apparatus comprises a magazine supporting the plurality of disks in a stack-like arrangement and which comprises at least one spiral element which defines a central axis and which is mounted for rotation about the central axis. The spiral element further defines a sequence of uniform axial spacings which are dimensioned to generally correspond to the thickness of the disks and the disks are disposed generally perpendicular to the central axis and with a portion of the peripheral edge portion of each disk being disposed within one of the axial spacings of the spiral element. A drive is provided for rotating the spiral element at a selected speed, and such rotation of the spiral element causes the disks to move in unison in an axial direction.

In a preferred embodiment, the magazine comprises a plurality of spiral elements, which are position to define a compartment which receives the disks, and a common drive is provided for rotating all of the spiral elements in either direction at a selected variable speed.

In accordance with the invention, it has been recognized, first, that it is possible to arrange in a simple manner equally dimensioned, disk-shaped objects on a conveyor device, in particular in the sequence of uniform axial spacings, or to arrange the disk-shaped objects such that at least their peripheral regions engage in the axial spacings of a spiral element. It has further been recognized that it is likewise possible to transport by means of rotatably supported, drivable spiral elements essentially round, disk-shaped objects, when they are arranged in the axial spacings of such a spiral element. The use of spiral elements for storing and transporting essentially round, disk-shaped, uniformly dimensioned objects is especially advantageous, since it is possible to attain a relatively great packing density of the disk-shaped objects. The spacing between two of the disk-shaped objects is defined only by the pitch of the spiral element. It is further of advantage that even for transporting the disk-shaped objects no additional means are needed, such as, for example, special plastic plates or the like, since the transportation occurs almost massless due to the rotation of the spiral element. It is also possible to enlarge the device of this invention in a simple manner by coupling several magazines. Furthermore, the exchange, as well as removal and addition of further disk-shaped objects is easy and can be done by anyone.

At this point, it should be explicitly pointed out that the apparatus of this invention can be used not only for storing and transporting compact-disk data carriers, but also for other disk-shaped objects, such as, for example, phonograph records, plates, etc.

To keep at any time during the archiving and also during the transportation each of the round, disk-shaped objects in a defined arrangement, it will be advantageous, when the axial spacing of the turns of the spiral element is dimensioned to correspond to the thickness of the disk-shaped objects, so that the spiral element forms a holder for the disk-shaped objects. The selective access to certain disk-shaped objects accommodated in the magazine can occur more effectively and faster, when the directions of the drive and rotation, as well as the rotational speed of the spiral element are selectable and variable. Suitable as a spiral element is both an element without core, such as a coil, and an element with a core, such as a worm.

Both the material of the spiral element and its surface quality are to be selected as a function of the disk-shaped objects to be stored and transported. For certain applications, it will be advantageous to surround the surface of the spiral element with a soft foam or woven material, so as protect the surface of the disk-shaped objects during their transportation. Likewise, the spiral element could consist of the same material as the disk-shaped object.

To stabilize the support of the disk-shaped objects during their transportation, it is advantageous to arrange in a magazine several spiral elements, which engage, distributed over the circumference, with peripheral regions of the disk-shaped objects. In this instance, it will be useful, when the rotational movement of the spiral elements is coupled, so that both the direction and the speed of the rotational movement of the spiral elements in a magazine can be varied jointly. In addition to the spiral elements serving as means of transportation, it is possible to also provide further support and guide means, for example, in the form of guide bars, which engage with peripheral regions of the disk-shaped objects.

In particular, when the entire apparatus of this invention is used as a module of an entire system, for example for playing CDs, it will be advantageous to also provide a manipulator, which has access to the end position of the magazine, since at each revolution of the spiral element, each of the disk-shaped objects is advanced by one position toward the corresponding end position of the magazine. With the use of the manipulator, it will then be possible to remove automatically from the magazine the disk-shaped object being in the respective end position, and to transfer it to a further device. It will be further advantageous, when it is also possible to position disk-shaped objects in the magazine with the use of the manipulator. A further device includes, for example, additional magazines, or in the instance of CDs a CD player, or likewise other devices in the instance of disk-shaped objects with other functions.

It will be especially advantageous, when the device comprises an arrangement of at least two, substantially equally long, parallel aligned magazines, which are provided each with at least one spiral element extending over the entire length of the magazine, and when at both ends of the magazine arrangement, at least one manipulator is provided with a selective access to one of the disk-shaped objects arranged in the respective end position of a magazine of the magazine arrangement. Such an arrangement represents a simple expansion of a storage device, the access times to a certain disk-shaped object being not substantially longer in comparison with the access to only one of the magazines. This has been accomplished by the parallel arrangement of individual magazines and the selective access to an end position of one of the two magazines.

An arrangement of two substantially equally long, parallel aligned magazines allows to realize in a simple manner a circulation or circular transportation of the disk-shaped objects, in that the rotational movements of the spiral elements of both magazines of the magazine arrangement are coupled accordingly. In this instance, at least one of the manipulators will serve as a transfer manipulator, in that it removes selectively a disk-shaped object from the end position of one of the two magazines and transfers it to the end position of the other magazine. When the manipulator arranged at the other end of the magazine arrangement also fulfills the function of a transfer manipulator, it will be possible to move the disk-shaped objects in a circular motion from one magazine into the other. This will be especially advantageous, when the other manipulator fulfills not only the function of a transfer manipulator, but can also remove in addition certain disk-shaped objects from circulation and transfer same to a further device, or add further disk-shaped objects to the circulation of the already stored objects. In particular, in the circular operation of such a magazine arrangement in accordance with the invention, it will be advantageous, when the movement of the manipulator or manipulators serving as transfer manipulators is coupled with the rotational movements of the spiral elements of the magazines in the magazine arrangement. A coordination of the manipulator movements as well as the rotational movements of the spiral elements, namely, the conveyor device and the speed of transportion, is also conceivable with the aid of sensors. In this instance, the apparatus of this invention can be enlarged simply by means, which permit to control and/or program the rotational movements of the spiral elements of the magazines and/or the movements of the manipulators. With the use of a PC-assisted control via data bases and with the aid of networks, it will, for example, be possible to program the direct selection of certain disk-shaped objects as well as the programming of a sequence of disk-shaped objects. This will be especially advantageous for uses in the CD field, when it is possible to automatically recall a sequence of music titles.

The use of the apparatus in accordance with the invention for storing and transporting disk-shaped objects with an opening of passage allows to realize the manipulator in a simple manner by at least one pinlike, selectively actuatable clamping device, which engages into the opening of passage in a disk-shaped object, and exerts in its actuated state a clamping effect on the peripheral region of the opening of passage. To shorten the access times, it will be advantageous, when, for example, the transfer manipulator is provided with at least two oppositely arranged, movable pinlike clamping devices, each for one disk-shaped object. Such a pinlike clamping device is formed in a simple manner by a conical pin and an arrangement of at least two leaf springs surrounding same and having hook-shaped end regions, the conical pin being slidable relative to the arrangement of leaf springs. Depending on the direction of displacement of the conical pin, the leaf springs are either pushed apart, or they approach each other based on their restoring force. This means the actuation or displacement of the conical pin relative to the leaf spring arrangement allows to selectively actuate or deactivate the clamping device. To secure the position of the pin relative to the leaf spring arrangement, further means may be provided, such as correspondingly configured sleeves or engaging means.

BRIEF DESCRIPTION OF THE DRAWINGS

Some of the objects and advantageous of the present invention having been stated, others will appear as the description proceeds, when considered in conjunction with the accompanying drawings in which.

DETAILED DESCRIPTION OF THE PREFERRED EMBODIMENT

Figure 1:
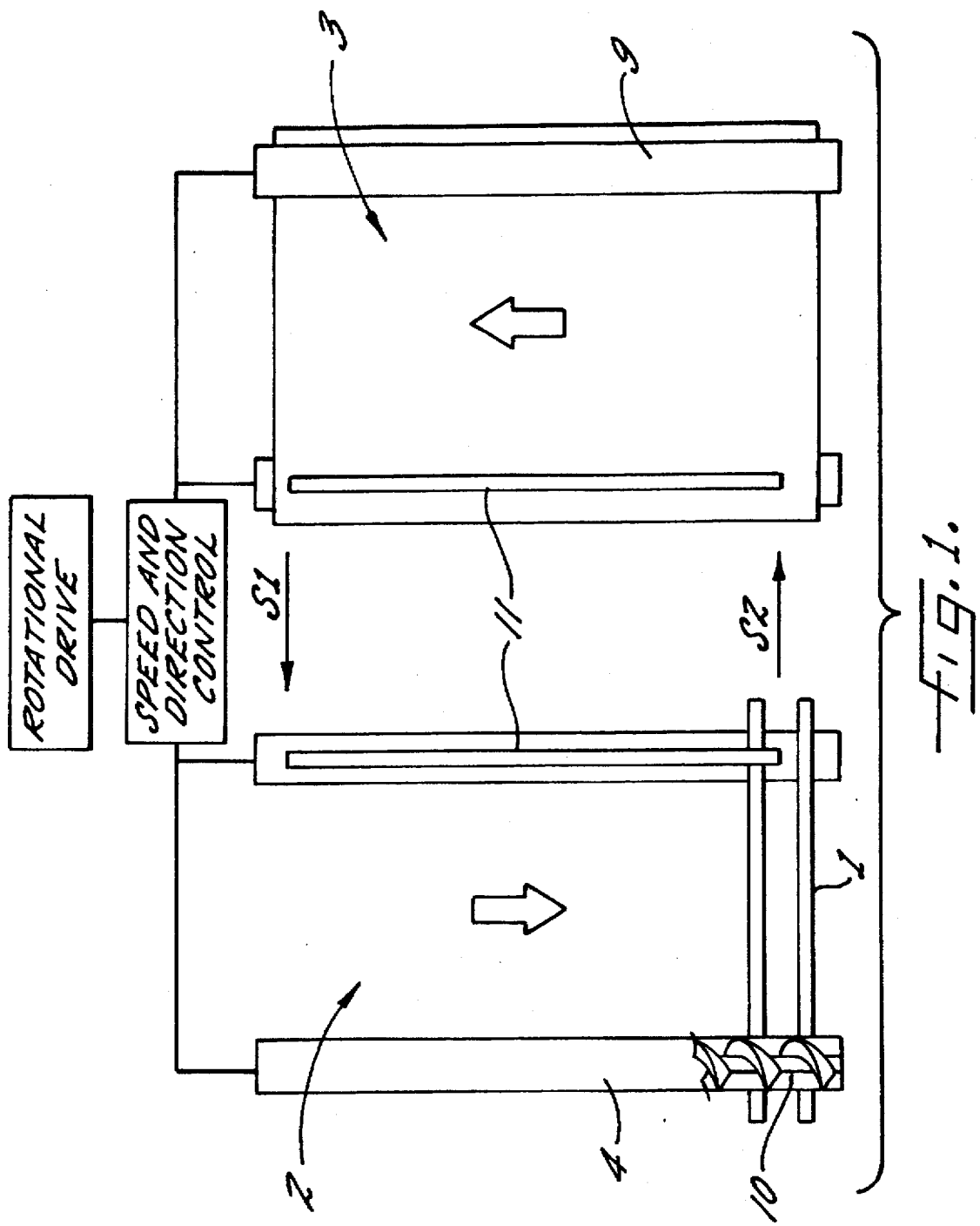
FIG. 1 is a top view of a magazine arrangement; which embodies the present invention

Shown in FIG. 1 is a top view of two parallel arranged magazines 2 and 3, it being possible to surround these magazines 2 and 3 each with its own or also with a common housing, which is not shown for the sake of clarity. The magazines 2 and 3 are constructed in point symmetry relative to one another. Therefore, in the following, only magazine 2 is described for the most part. Arranged in magazine 2 are spiral elements 4, 5, and 6, of which only spiral element 4 is recognizable in the top view. The spiral elements 4, 5, and 6 are formed by worms supported for rotation about their center axis, and having each a sequence of uniform axial spacings 10. Arranged for engagement in axial spacings 10 are disk-shaped objects, in the present embodiment CDs 1. The magazine 3 is equipped correspondingly with worms 7, 8, and 9. Further shown in the top view of the magazine arrangement are retaining bars, which extend in magazines 2 and 3, each parallel to worms 4 and 9. These retaining bars serve as guide means for the CDs 1, which are transported by a rotational movement of worms 4, 5, 6; 7, 8, 9 of each magazine 2, 3, depending on the direction of rotation within magazines 2, 3, in the directions indicated by the double arrows. At each rotation of worms 4, 5, 6, 7, 8, 9 of a magazine 2, 3, the CDs 1 are advanced by one position in the respective direction. Depending on the configuration of the axial spacing or pitch of the worms, as well as on the material and surface quality of the worms in combination with the surface quality of the CDs or other disk-shaped objects, the CDs or the other disk-shaped objects are rotated along during the movement of transportation.

Figure 2:
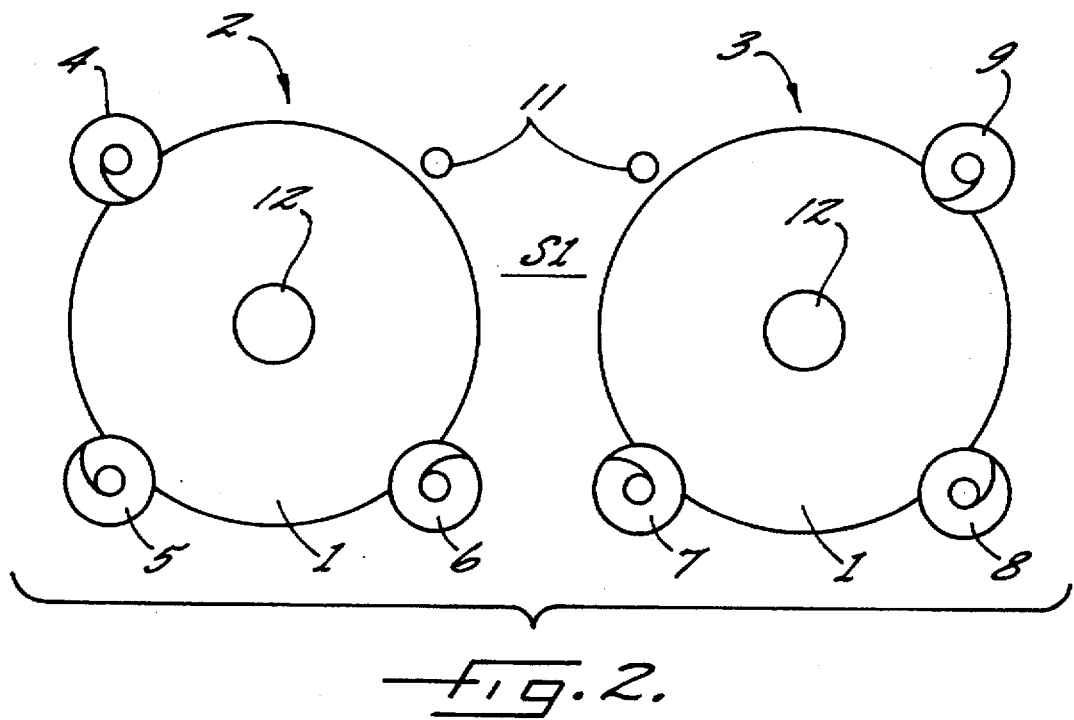
FIG. 2 is a front view of the magazine arrangement shown in FIG. 1.

FIG. 2 is a front view of the arrangement shown in FIG. 1. As can be noted, the CDs of each magazine 2 and 3 are held and transported, each by three worms 4, 5, and 6, as well as 7, 8, and 9 distributed over the circumference of the CDs and engaging with same. Indicated by arrow S1 is that a transfer of the CDs is intended from the one magazine 2 to the other magazine 3, in that one CD each is transferred from the one end position of the one magazine 2 to the corresponding end position of the other magazine 3. To this end, the retaining bars are made shorter than worms 4, 5, 6; 7, 8, 9 of both magazines 2 and 3, as is best seen in FIG. 1. To transfer the CDs 1, a manipulating device is provided, the operating method of which is shown in FIGS. 3a–c.

Figure 3A:
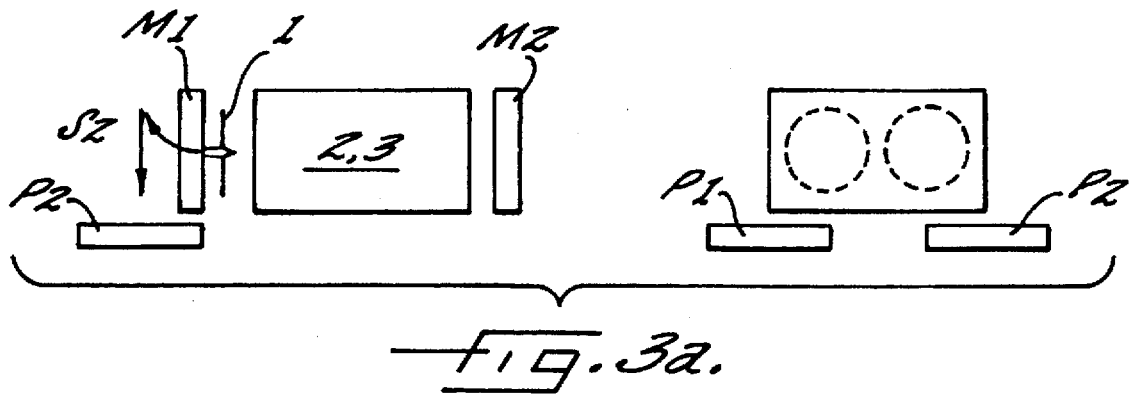
FIGS. 3a–c are a schematic view of the operating method of the manipulators.
Figure 3B:
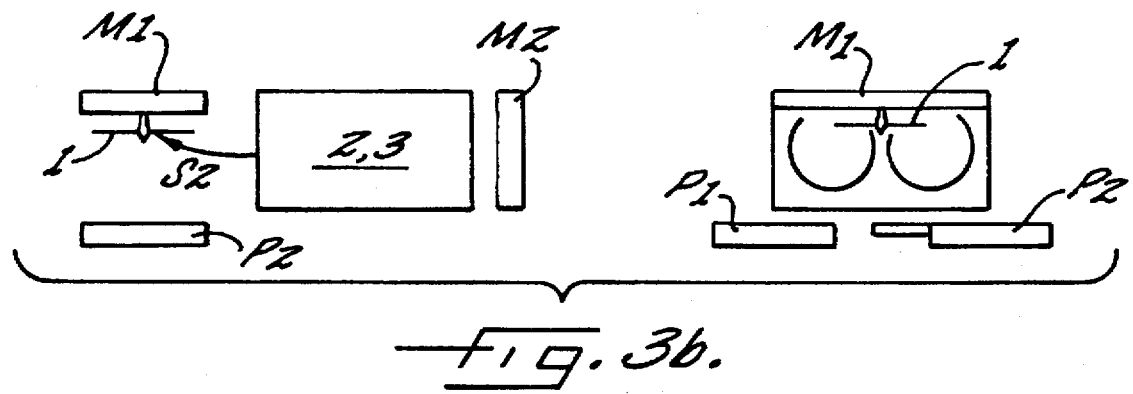
Figure 3C:
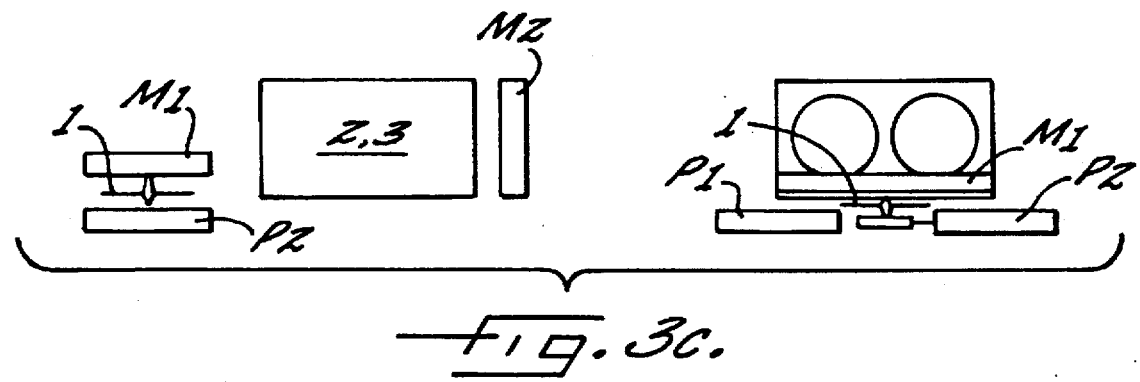

Shown in the left column of FIGS. 3a–c is a side view of each magazine arrangement 2, 3 with manipulators M1 and M2. Shown in the right column is the corresponding front view of each magazine arrangement 2, 3. The manipulator indicated at M2 at one end of magazine arrangement 2, 3 serves only to transfer the CDs 1 from the one magazine to the other magazine, thereby realizing a kind of circular movement of the CDs in both magazines 2, 3. The manipulator indicated at M1 serves both to transfer CDs from the one magazine to the other magazine, and to remove CDs and transfer same to further devices, such as the slide of a CD player P2. Arrow P2 indicates the path, which is covered by a CD, when it is grasped by manipulator M1 and transferred to a CD player P2. CD describes the same path in opposite direction, when it is removed by manipulator M1 from CD player P2 and returned to one of magazines 2 or 3. Shown in the front view is that the device of this invention is suitably used in combination with two CD players P1 and P2, which are served alternately.

Figure 4:
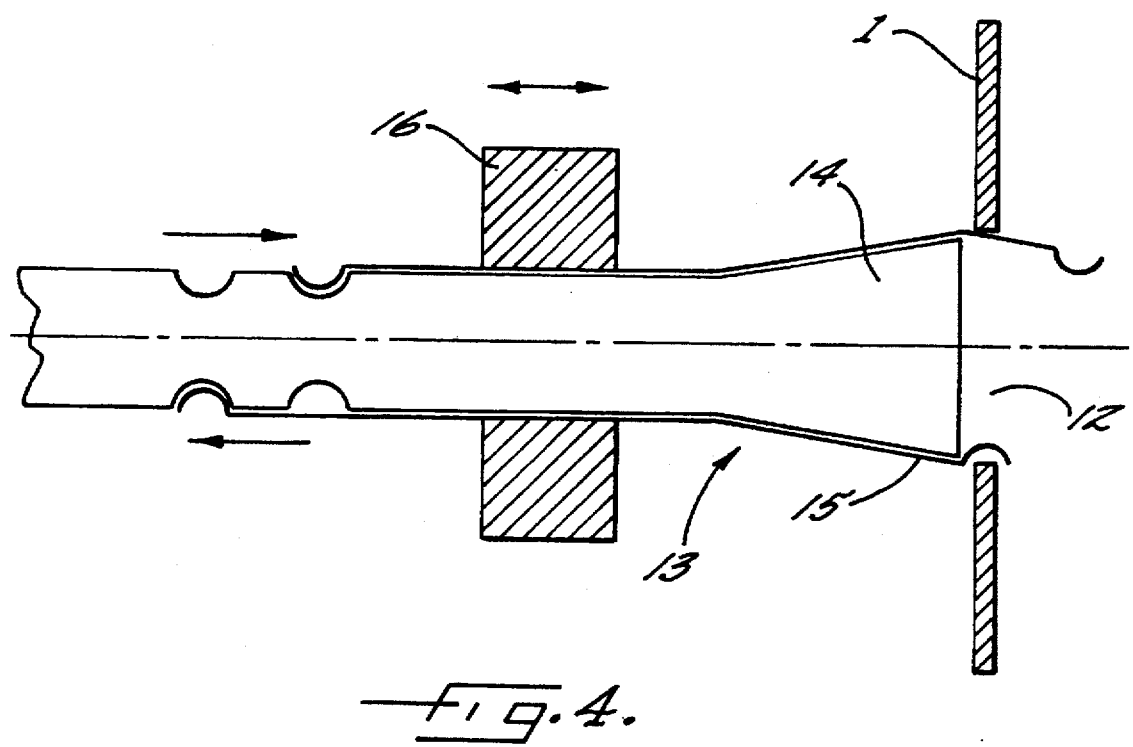
FIG. 4 shows the configuration of a pinlike clamping device.

Shown in FIG. 4 is a clamping device 13, which is provided with a conical pin 14. This pin is surrounded by an arrangement of leaf springs 15, which are shaped to a hook in their end regions. The pin 14 is adapted for sliding toward the arrangement of leaf springs 15. Depending on the direction of displacement, it selectively spreads apart the hook-shaped end regions of leaf springs 15, or causes the hook-shaped end regions of leaf springs 15 approach one another based on their restoring forces. The position of conical pin 14 relative to leaf springs 15 can be secured by a sleeve 6. This clamping device 13 which forms a part of a manipulator, engages in the opening 12 of a CD 1. It is actuated, in that the hook-shaped end regions of leaf springs 15 are spread apart by sliding pin 14. In so doing, the hook-shaped end regions of leaf springs 15 exert a clamping effect on the peripheral region of opening 12 in CD 1, so as to permit the manipulator to reliably grasp and transport the CD 1. To this end, the clamping effect or the position of conical pin 14 relative to the arrangement of leaf springs 15 is secured by sleeve 16. After the transportation of CD 1, the clamping effect can be released by a further displacement of pin 14 in opposite direction to the arrangement of leaf springs 15. The securing of the relative position of pin 14 to the arrangement of leaf springs 15 may however be realized also by engaging means correspondingly arranged and configured on pin 14 and leaf springs 15.

As regards further characteristics not shown in the Figures, reference may be made to the general part of the description.

Finally, it should be emphasized that the teaching of the present invention is not limited to the above-described embodiment. Rather, the teaching of this invention may be realized likewise on differently configured devices depending on the dimensions and functions of the round, disk-shaped objects to be stored and transported.

I claim:

1. A data storage and transporting apparatus comprising
   a plurality of data storage disks of uniform dimensions, and with the disks each having an essentially round peripheral edge portion,
   a magazine supporting said plurality of disks in a stack-like arrangement and comprising a plurality of spiral elements, with each spiral element defining a central axis and being mounted for rotation about the central axis, with each spiral element further defining a sequence of uniform axial spacings which are dimensioned to generally correspond to the thickness of the disks, and with the spiral elements being arranged in a laterally spaced apart, parallel arrangement so as to define a compartment therebetween, and with the disks being disposed in the compartment and generally perpendicular to the central axes of the spiral elements, and with a portion of the peripheral edge portion of each disk being disposed within one of the axial spacings of each of the spiral elements,
   whereby rotation of the spiral elements causes the disks to move in unison in an axial direction,
   wherein the axial spacings of the spiral elements define an end position which is adapted to receive a disk of said plurality of disks which is at one end of the stack like arrangement of said disks, and
   wherein the apparatus further comprise a manipulator for engaging the disk in said end position and withdrawing the same and inserting the disk into said end position.

2. The apparatus as defined in claim 1 further comprising drive means for concurrently rotating each of the spiral elements at the same selected speed.

3. The apparatus as defined in claim 1 further comprising drive means for concurrently rotating each of the spiral elements in either direction at a selectively variable speed.

4. The apparatus as defined in claim 1 wherein said magazine further comprises at least one support bar disposed parallel to and laterally spaced from each of the spiral elements and so as to supportingly engage the peripheral edge portions of the disks.

5. The apparatus as defined in claim 1 wherein each of said disks includes a central opening, and wherein said manipulator comprises a clamping element which is adapted to pass through the opening of a disk and then be expanded to engage the periphery of the opening and thereby grippingly engage the disk.

6. The apparatus as defined in claim 5 wherein the clamping element comprises a conical pin and at least two leaf springs surrounding the conical pin and being slidable relative to the pin so as to cause the leaf springs to expand or contract.

7. The apparatus as defined in claim 2 wherein said magazine comprises three of said spiral elements, with the three spiral elements being positioned to encompass not more than about 180° of the peripheral edge portions of said plurality of disks.

8. A data storage and transporting apparatus comprising a plurality of data storage disks of uniform dimensions, and with the disks each having an essentially round peripheral edge portion, a first magazine supporting a first group of said plurality of disks in a stack-like arrangement and a second magazine supporting a second group of said plurality of disks in a stack-like arrangement, with said first and second magazines being disposed in an adjacent side by side arrangement, each of said first and second magazines comprising a plurality of spiral elements, with each spiral element defining a central axis and being mounted for rotation about the central axis, with each spiral element further defining a sequence of uniform axial spacings which are dimensioned to generally correspond to the thickness of the disks, and with the spiral elements being arranged in a laterally spaced apart, parallel arrangement so as to define a compartment therebetween, and with the disks being disposed in the compartment and generally perpendicular to the central axes of the spiral elements, and with a portion of the peripheral edge portion of each disk being disposed within one of the axial spacings of each of the spiral elements, drive means for rotating each of the spiral elements of each of said magazines at a selected speed, so as to cause the disks in each of said magazines to move in unison in an axial direction, wherein the axial spacings of the spiral elements of each of said first and second magazines define an end position which is adapted to receive disk of said plurality of disks which is at one end of the stack-like arrangement of said disk, and wherein the apparatus further comprises a manipulator for engaging the disk in said end position of one of said magazines and transferring the disk to the end position of the other magazine.

9. The apparatus as defined in claim 8 wherein said drive means of the first and second magazines are coupled for concurrent operation.

* * * * *